UNITED STATES PATENT OFFICE.

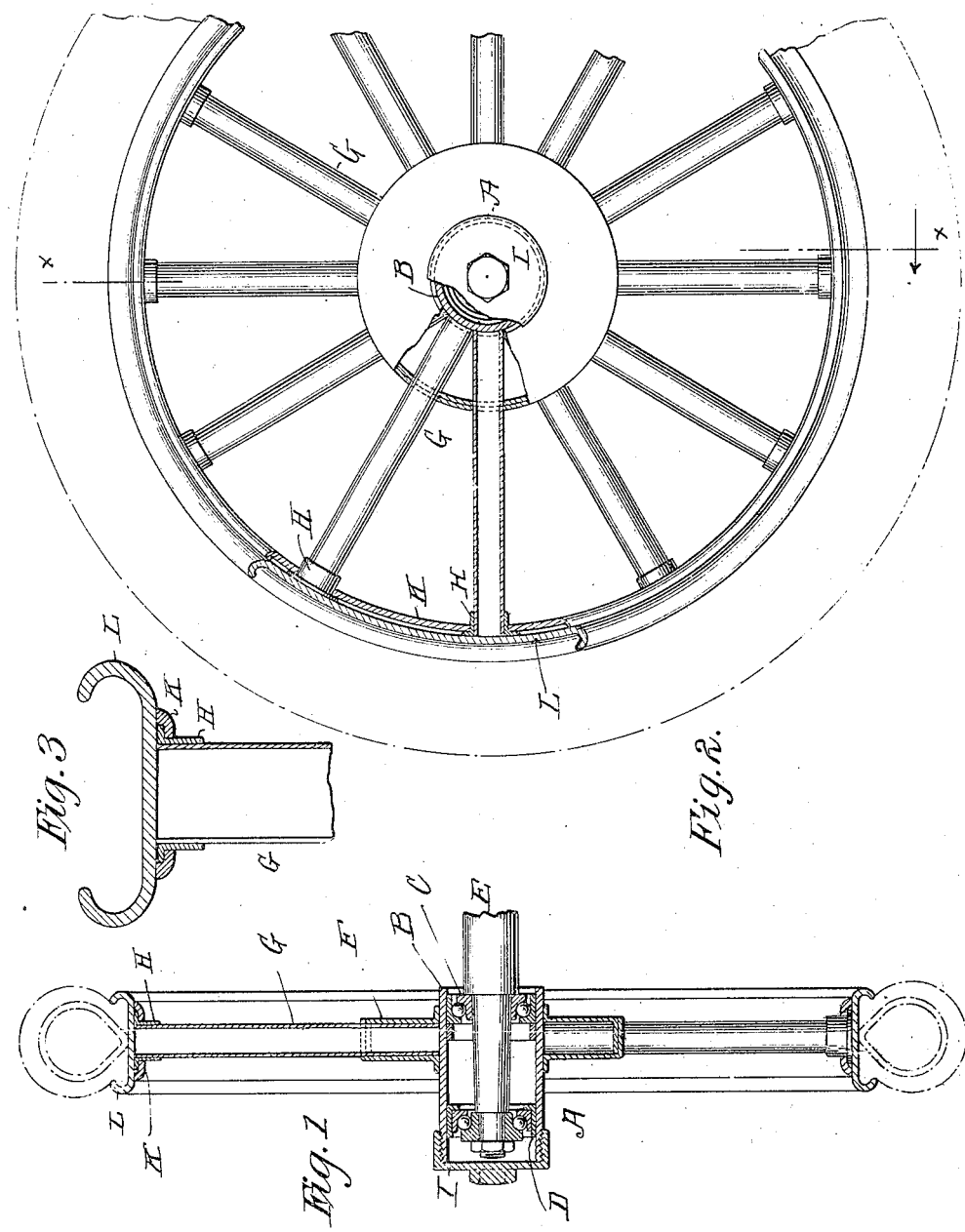

THOMAS E. MURRAY, OF NEW YORK, N. Y.

VEHICLE-WHEEL.

1,132,675.

Specification of Letters Patent.

Patented Mar. 23, 1915.

Application filed June 4, 1914. Serial No. 842,828.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention is a vehicle wheel of sheet metal, and consists in the construction hereinafter set forth, whereby I am enabled to produce at low cost a wheel of great strength and lightness.

In the accompanying drawings—Figure 1 is a section on the line $x, x$ of Fig. 2. Fig. 2 is an elevation showing certain parts broken away and in section. Fig. 3 is an enlarged cross section of the rims and the end of a spoke.

Similar letters of reference indicate like parts.

The hub, generally designated at A, comprises a cylindrical portion B, containing the usual ball bearings C, D for the axle E, and an annular hollow flange F. Said flange is preferably formed of two disks secured upon said cylindrical portion and having their outer circumferential edges inwardly turned to overlap one another. Through said overlapping edges are made openings for the reception of the spokes G, which at their inner ends preferably bear against said cylindrical hub portion B. The spokes G are preferably made by bending a metal plate in tubular form and uniting its longitudinal edges by welding one to the other. The outer ends of the spokes are received in ferrules H which are secured in openings in the felly K. Said ferrules may be flanged and placed in the felly openings with their flanges bearing on the outer surface of said felly.

The parts above described are to be homogeneously united, as by spot-welding. A tire-supporting rim L is preferably shrunk upon the felly K. The outer end of the cylindrical hub portion B is threaded to receive a cap I.

I claim:

A vehicle wheel, comprising a hub, tubular spokes thereon, a felly having openings, and flanged ferrules having their flanges seated on the outer surface of said felly and extending radially inward through said openings and inclosing the ends of said spokes; the said parts being of sheet metal and homogeneously united.

In testimony whereof I have affixed my signature in presence of two witnesses.

THOMAS E. MURRAY.

Witnesses:
 GERTRUDE T. PORTER,
 MAY T. McGARRY.